(12) United States Patent
Cheng et al.

(10) Patent No.: US 12,347,223 B2
(45) Date of Patent: *Jul. 1, 2025

(54) METHOD AND SYSTEM FOR DETECTING AND RECOGNIZING TARGET IN REAL-TIME VIDEO, STORAGE MEDIUM, AND DEVICE

(71) Applicant: Tencent Technology (Shenzhen) Company Limited, Shenzhen (CN)

(72) Inventors: Jun Cheng, Shenzhen (CN); Haibao Shang, Shenzhen (CN); Feng Li, Shenzhen (CN); Haoyuan Li, Shenzhen (CN); Xiaoxiang Zuo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 219 days.

This patent is subject to a terminal disclaimer.

(21) Appl. No.: 18/114,513

(22) Filed: Feb. 27, 2023

(65) Prior Publication Data

US 2023/0222838 A1 Jul. 13, 2023

Related U.S. Application Data

(63) Continuation of application No. 17/012,761, filed on Sep. 4, 2020, now Pat. No. 11,625,921, which is a
(Continued)

(30) Foreign Application Priority Data

Jul. 13, 2018 (CN) .......................... 201810771226.X

(51) Int. Cl.
*G06V 20/00* (2022.01)
*G06F 18/21* (2023.01)
(Continued)

(52) U.S. Cl.
CPC ............ *G06V 40/113* (2022.01); *G06F 18/21* (2023.01); *G06N 3/045* (2023.01); *G06N 3/08* (2013.01);
(Continued)

(58) Field of Classification Search
CPC .. G06V 20/46; G06V 40/113; G06V 2201/07; G06T 7/70; G06T 2207/10016;
(Continued)

(56) References Cited

U.S. PATENT DOCUMENTS 10,304,208 B1\* 5/2019 Chandler ............... G06F 3/0304
2017/0161607 A1\* 6/2017 English ................. G06N 3/044
(Continued)

FOREIGN PATENT DOCUMENTS

CN 105787867 A 7/2016
CN 107492115 A 12/2017
(Continued)

OTHER PUBLICATIONS

International Search Report and Written Opinion with English Translation for International Application No. PCT/CN2019/092791 dated Sep. 26, 2019; 11 pages.

*Primary Examiner* — Fayyaz Alam
(74) *Attorney, Agent, or Firm* — Crowell & Moring LLP

(57) ABSTRACT

This disclosure provides a method and a system for detecting and recognizing a target object in a real-time video. The method includes: determining whether a target object recognition result $R_{X-1}$ of a previous frame of image of a current frame of image is the same as a target object recognition result $R_{X-2}$ of a previous frame of image of the previous frame of image; performing target object position detection in the current frame of image by using a first-stage neural network to obtain a position range $C_X$ of a target object in the current frame of image when the two recognition results
(Continued)

$R_{X-1}$ and $R_{X-2}$ are different; or determining a position range $C_X$ of a target object in the current frame of image according to a position range $C_{X-1}$ of the target object in the previous frame of image when the two recognition results $R_{X-1}$ and $R_{X-2}$ are the same; and performing target object recognition in the current frame of image according to the position range $C_X$ by using a second-stage neural network. Therefore, the operating frequency of the first-stage neural network used for position detection is reduced, the recognition speed is accelerated, and the usage of CPU and internal memory resources is reduced.

20 Claims, 6 Drawing Sheets

Related U.S. Application Data continuation of application No. PCT/CN2019/092791, filed on Jun. 25, 2019.

(51) Int. Cl.

| | |
|---|---|
| *G06N 3/045* | (2023.01) |
| *G06N 3/08* | (2023.01) |
| *G06T 7/70* | (2017.01) |
| *G06V 10/764* | (2022.01) |
| *G06V 10/82* | (2022.01) |
| *G06V 20/40* | (2022.01) |
| *G06V 40/10* | (2022.01) |
| *G06V 40/16* | (2022.01) |

(52) U.S. Cl.
 CPC .............. *G06T 7/70* (2017.01); *G06V 10/764* (2022.01); *G06V 10/82* (2022.01); *G06V 20/40* (2022.01); *G06V 20/46* (2022.01); *G06V 40/176* (2022.01); *G06T 2207/10016* (2013.01); *G06T 2207/20084* (2013.01); *G06T 2207/30196* (2013.01); *G06V 2201/07* (2022.01)

(58) Field of Classification Search
 CPC ........... G06T 2207/20084; G06T 2207/30196; G06K 9/6217; G06N 3/0454; G06N 3/08
 See application file for complete search history.

(56) References Cited

U.S. PATENT DOCUMENTS

| | | | | |
|---|---|---|---|---|
| 2019/0251702 | A1* | 8/2019 | Chandler | ................ G10L 15/24 |
| 2020/0026910 | A1* | 1/2020 | Wang | ..................... G06N 3/084 |
| 2022/0036050 | A1* | 2/2022 | Chandler | ............... G06V 40/20 |

FOREIGN PATENT DOCUMENTS

| | | |
|---|---|---|
| CN | 107944376 A | 4/2018 |
| CN | 108229277 A | 6/2018 |

* cited by examiner

METHOD AND SYSTEM FOR DETECTING AND RECOGNIZING TARGET IN REAL-TIME VIDEO, STORAGE MEDIUM, AND DEVICE

RELATED APPLICATION

This application is a continuation application of U.S. application Ser. No. 17/012,761, filed on Sep. 4, 2020, which is a continuation application of the International PCT Application No. PCT/CN2019/092791, filed with the China National Intellectual Property Administration, PRC on Jun. 25, 2019 which claims priority to Chinese Patent Application No. 201810771226.X, entitled "METHOD AND SYSTEM FOR DETECTING AND RECOGNIZING TARGET IN REAL-TIME VIDEO" and filed with the China National Intellectual Property Administration, PRC on Jul. 13, 2018, all of which are incorporated herein by reference in their entireties.

FIELD OF THE TECHNOLOGY

This disclosure relates to the field of artificial intelligence (AI) and image recognition technologies, and in particular, to a method, a system, a storage medium, and a device for detecting and recognizing a target in a real-time video.

BACKGROUND OF THE DISCLOSURE

With the continuous improvement of visual recognition accuracy, a method for recognizing and classifying an image by using a convolutional neural network (CNN) has been gradually accepted and adopted by the industry. Usually, an ImageNet dataset is used as a test dataset for evaluating the performance of a model or an algorithm. In recent years, various new CNN structures, for example, an Alex network (AlexNet) model proposed in 2012, a Visual Geometry Group (VGG) model proposed in 2014, and Google's LeCun network (GoogLeNet) model and a residual network (ResNet) model proposed later, have been continuously proposed. Great progress has been made for CNNs on the basis of an original LeCun network (LeNet). In addition, optimal positioning and classification performance of the ImageNet dataset repeatedly reach record highs. Historical ImageNet Large Scale Visual Recognition Challenge (ILSVRC) results show that error rates of the top 5 candidates fall gradually from AlexNet's 16.4% in 2012 to ResNet's 3.57% in 2015 and further below 3% in 2016. As the accuracy of a model improves, the depth of a network structure increases constantly. In ILSVRC 2012, an AlexNet has only eight layers. In ILSVRC 2015, a ResNet has 152 layers. Currently, a ResNet has even $10^3$ layers. Although a GoogLeNet and a ResNet have fewer fully connected layers and fewer nodes at the fully connected layers than an AlexNet and a VGG, the total workload of model computation increases sharply because of the rapid increase in the number of layers.

However, currently there is no satisfying solution in certain application scenarios where a target object needs to be located first to be recognized such as in the case of gesture recognition. No current network structures can implement adequate recognition when the proportion of a target area in an image is less than 50% of the image. For example, in gesture recognition, if a gesture area accounts for a small proportion of an image, it is difficult to focus on the gesture area to learn a gesture-related feature. As a result, a corresponding gesture cannot be recognized.

To resolve this problem, inventor of this disclosure considered the approach of using a cascaded CNN to sequentially perform object detection and recognition on every frame of a video. However, to better implement detection and recognition, computation workload gradually increases as the depth of a neural network increases. The computation of a two-stage neural network occupies a large quantity of CPU resources. As a result, synchronous target detection and recognition in a real-time video playback process causes a high burden on a CPU and imposes higher requirements on the computation capability of the CPU. In addition, during the application of an existing mobile terminal, the running of such a CPU intensive application produces intense heat that is almost destructive to the hardware of the mobile terminal.

SUMMARY

This disclosure is intended to resolve at least one of the technical problems in the foregoing related art. This disclosure provides a method and a system for detecting and recognizing a target in a real-time video, a storage medium, and a device.

To achieve the foregoing objective, an embodiment of a first aspect of this disclosure provides a method for detecting and recognizing a target in a real-time video, performed by a computing device, and including:

determining whether a target object recognition result $R_{X-1}$ of a previous frame of image of a current frame of image is the same as a target object recognition result $R_{X-2}$ of a previous frame of image of the previous frame of image;

performing target object position detection on the current frame of image by using a first-stage neural network to obtain a position range $C_X$ of a target object in the current frame of image in a case that the two recognition results $R_{X-1}$ and $R_{X-2}$ are different; or determining a position range $C_X$ of a target object in the current frame of image according to a position range $C_{X-1}$ of the target object in the previous frame of image without using a first-stage neural network in a case that the two recognition results $R_{X-1}$ and $R_{X-2}$ are the same; and performing target object recognition on the current frame of image according to the position range $C_X$ of the target object in the current frame of image by using a second-stage neural network to obtain a target object recognition result $R_X$ of the current frame of image.

In some embodiments, the performing target object position detection on the current frame of image by using a first-stage neural network includes:

determining, by using the first-stage neural network, whether the current frame of image includes the target object; and obtaining the position range $C_X$ of the target object in the current frame of image by using the first-stage neural network in a case that the current frame of image includes the target object; or setting an interval for determining whether a frame of image includes the target object to a predetermined number of frames in a case that the current frame of image does not include the target object, and continuously performing determination by using the first-stage neural network until it is determined that a frame of image includes the target object.

In some embodiments, the performing target object recognition on the current frame of image according to the position range $C_X$ of the target object in the current frame of image by using a second-stage neural network to obtain a target object recognition result $R_X$ of the current frame of image includes:
- extending the position range $C_X$ of the target object in the current frame of image to obtain an extended position range with an area increased by a predefined multiple; and
- performing the target object recognition within the extended position range by using the second-stage neural network to obtain the target object recognition result $R_X$ of the current frame of image.

In some embodiments, the determining a position range $C_X$ of a target object in the current frame of image according to a position range $C_{X-1}$ of the target object in the previous frame of image includes:
- using the position range $C_{X-1}$ of the target object in the previous frame of image as the position range $C_X$ of the target object in the current frame of image; or
- predicting the position range $C_X$ of the target object in the current frame of image according to the position range of the target object in the previous frame of image and a position range of the target object in a frame of image previous to the current frame of image by a predefined number of frames.

In some embodiments, the target object is a hand;
the performing target object position detection on the current frame of image by using a first-stage neural network to obtain a position range $C_X$ of a target object in the current frame of image includes: recognizing a position range of the hand in the current frame of image by using the first-stage neural network; and
the performing target object recognition on the current frame of image according to the position range $C_X$ of the target object in the current frame of image by using a second-stage neural network to obtain a target object recognition result $R_X$ of the current frame of image includes: performing gesture recognition on the hand in the current frame of image according to the position range $C_X$ of the target object in the current frame of image by using the second-stage neural network, a recognition result being a gesture pose.

According to the method for detecting and recognizing a target in a real-time video provided in this disclosure, a target object position detection result of a previous frame of image can be used, so that the operating frequency of a first-stage neural network used for position detection is reduced, the speed of detecting and recognizing a target object is increased, and the usage of a CPU and internal memory resources is reduced, thereby improving the overall performance of a recognition algorithm. In the condition that the two stages of a neural network adopt the same structure, compared with the solution in which a first-stage neural network is running for recognition on each frame of image, more than 50% of CPU resources can be saved by using the method of this disclosure.

An embodiment of a second aspect of this disclosure provides a system for detecting and recognizing a target in a real-time video, including:
- a first-stage neural network, configured to perform target object position detection on a video image frame to obtain a target object position range;
- a second-stage neural network, configured to perform target object recognition on the video image frame according to the target object position range to obtain a recognition result; and
- a neural network operation control module, configured to:
  - determine whether a target object recognition result $R_{X-1}$ of a previous frame of image of a current frame of image is the same as a target object recognition result $R_{X-2}$ of a previous frame of image of the previous frame of image;
  - control the first-stage neural network to perform target object position detection on the current frame of image to obtain a position range $C_X$ of a target object in the current frame of image in a case that the two recognition results $R_{X-1}$ and $R_{X-2}$ are different; or
  - determine a position range $C_X$ of a target object in the current frame of image according to a position range $C_{X-1}$ of the target object in the previous frame of image without using the first-stage neural network in a case that the two recognition results $R_{X-1}$ and $R_{X-2}$ are the same; and
  - control the second-stage neural network to perform target object recognition on the current frame of image according to the position range $C_X$ of the target object in the current frame of image to obtain a target object recognition result $R_X$ of the current frame of image.

In some embodiments, during controlling the first-stage neural network to perform the target object position detection on the current frame of image, the neural network operation control module is configured to:
- control the first-stage neural network to determine whether the current frame of image includes the target object; and
- control the first-stage neural network to obtain the position range $C_X$ of the target object in the current frame of image in a case that the current frame of image includes the target object; or
- set an interval for determining whether a frame of image includes the target object to a predetermined number of frames in a case that the current frame of image does not include the target object, and control the first-stage neural network to continuously perform determination until it is determined that a frame of image includes the target object.

In some embodiments, during controlling the second-stage neural network to perform the target object recognition on the current frame of image according to the position range $C_X$ of the target object in the current frame of image to obtain the target object recognition result Rx of the current frame of image, the neural network operation control module is configured to:
- extend the position range $C_X$ of the target object in the current frame of image to obtain an extended position range with an area increased by a predefined multiple; and
- control the second-stage neural network to perform the target object recognition within the extended position range to obtain the target object recognition result $R_X$ of the current frame of image.

In some embodiments, when determining the position range $C_X$ of the target object in the current frame of image according to the position range $C_{X-1}$ of the target object in the previous frame of image, the neural network operation control module is configured to:
- use the position range $C_{X-1}$ of the target object in the previous frame of image as the position range $C_X$ of the target object in the current frame of image; or
- predict the position range $C_X$ of the target object in the current frame of image according to the position range of the target object in the previous frame of image and a position range of the target object in a frame of image previous to the current frame of image by a predefined number of frames.

In some embodiments, the target object is a hand; during controlling the first-stage neural network to perform the target object position detection on the current frame of image to obtain a position range $C_X$ of the target object in the current frame of image, the neural network operation control module is configured to: control the first-stage neural network to recognize a position range of the hand in the current frame of image; and during controlling the second-stage neural network to perform the target object recognition on the current frame of image according to the position range $C_X$ of the target object in the current frame of image to obtain the target object recognition result $R_X$ of the current frame of image, the neural network operation control module is configured to control the second-stage neural network to perform gesture recognition on the hand in the current frame of image according to the position range $C_X$ of the target object in the current frame of image, a recognition result being a gesture pose.

According to the system for detecting and recognizing a target in a real-time video provided in this disclosure, a target object position detection result of a previous frame of image can be used, so that the operating frequency of a first-stage neural network used for position detection is reduced, the speed of detecting and recognizing a target object is increased, and the usage of a CPU and internal memory resources is reduced, thereby improving the overall performance of a recognition algorithm. In the condition that the two stages of a neural network adopt the same structure, compared with the solution in which a first-stage neural network is operated for recognition on each frame of image, more than 50% of CPU resources can be saved by using the method of this disclosure.

To achieve the foregoing objective, an embodiment of a third aspect of this disclosure provides a non-transitory computer-readable storage medium, the non-transitory computer-readable storage medium storing a computer program, the program, when executed by a processor, implementing the method for detecting and recognizing a target in a real-time video provided in the first aspect of this disclosure.

To achieve the foregoing objective, an embodiment of a fourth aspect of this disclosure provides a computer program product, an instruction in the computer program product, when executed by a processor, implementing the method for detecting and recognizing a target in a real-time video provided in the first aspect of this disclosure.

To achieve the foregoing objective, an embodiment of a fifth aspect of this disclosure provides a computing device, the computing device including a memory, a processor, and a computer program stored in the memory and executable on the processor, the processor, when executing the program, implementing the method for detecting and recognizing a target in a real-time video provided in the first aspect of this disclosure.

The non-transitory computer-readable storage medium, the computer program product, and the computing device provided in the third to fifth aspects of this disclosure have beneficial effects similar to those of the method and the system for detecting and recognizing a target in a real-time video provided in the first and second aspects of this disclosure. Details are not described herein again.

BRIEF DESCRIPTION OF THE DRAWINGS

The foregoing and/or additional aspects and advantages of this disclosure will become more obvious and easier to understand from the following descriptions of the embodiments with reference to the accompanying drawings.

DESCRIPTION OF EMBODIMENTS

Figure 1:
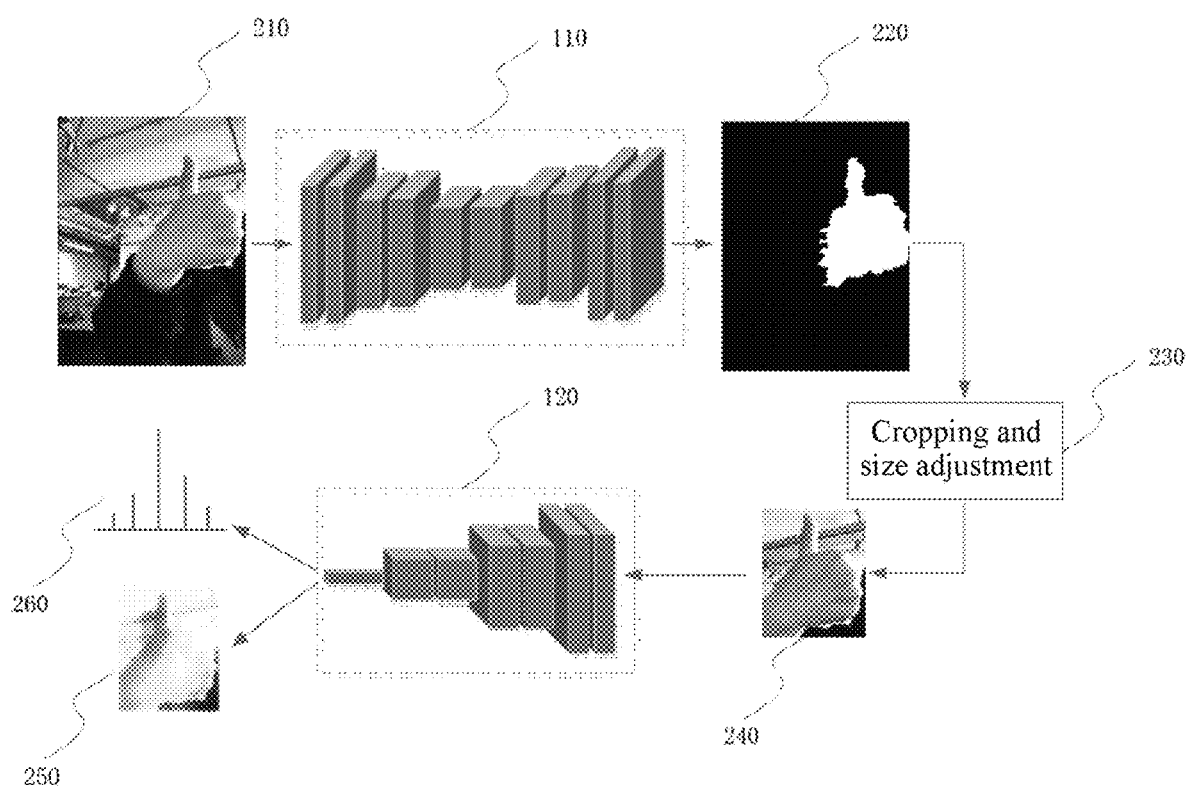
FIG. 1 is a schematic diagram showing a working principle of a cascaded neural network for target detection and recognition according to an embodiment of this disclosure.

The following describes embodiments of this disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain this disclosure and cannot be construed as a limitation to this disclosure.

During the detection and recognition of a target in a real-time video, the video needs to be split into image frames, and a target is then detected and recognized based on a single frame of image. From the perspective of a discernible frequency limit of naked eyes, human eyes can no longer further discern any difference when a video frame rate exceeds 30 frames per second. Therefore, currently the video frame rate is usually set to 30 frames per second or less.

30 frames per second is used as an example. Test results of a method for detecting and recognizing a target in each frame of image by using a two-stage CNN show that, CPU usage may reach approximately 45% during target detection and recognition on a real-time video by using a U-shaped network (U-net is one type of fully convolutional neural network (FCN) suitable for semantic image segmentation) as a first-stage neural network, a VGG structure as a second-stage neural network, and iPhone X (which has good performance among existing mobile terminals) as the hardware device. If a more complex network structure is adopted, CPU usage may further increase.

In an application scenario of playing a video and simultaneously capturing a gesture by using a camera to recognize user evaluation and feedback, or in another application scenario of broadcasting live video and simultaneously recognizing a gesture, a facial expression or another target, a CPU remains in a high-load state because CPU usage is high during both video information processing and target object recognition. For a mobile terminal, continuous high-load running of the CPU may heat up the body of the mobile terminal. As a result, this is unacceptable for both a user and the hardware of the mobile terminal in most cases.

In addition, to synchronize target recognition results with video frames, a main thread in the application may need to be blocked during the recognition. For mid-end and low-end devices with low computation capabilities, due to low CPU computing power and long target recognition processing duration, the video rendering frame rate may decrease and a video freeze may occur, making it impossible to use a neural network for target recognition on low-end devices.

To resolve the problem of high CPU usage and long recognition duration of a target recognition in the related art, this specification provides a high-performance method for detecting and recognizing a target. A target object does not tend to make a large-scale displacement in adjacent video frames. With such a characteristic, if a target object does not displace or the displacement of the target object does not affect recognition, a position range of the target object in a current frame may be determined by using a historical recognition result of a position range of the target object, thereby reducing the usage of a first-stage (also referred to as front-stage) neural network for position detection and reducing calculation workload.

The following describes the method and the system provided in the embodiments of this disclosure in detail with reference to the accompanying drawings.

For better understanding of this disclosure, the following first describes a working principle of performing target detection and recognition by using a cascaded two-stage neural network. FIG. 1 is a schematic diagram showing a working principle of a cascaded neural network for target detection and recognition according to an embodiment of this disclosure. The neural network used for target detection and recognition may include a first-stage neural network 110 and a second-stage neural network 120 (also referred to as a next-stage network).

The first-stage neural network 110 is configured to perform target object position detection on a video image frame to obtain a position range of a target object, that is, an area of the target object in an image. The position detection may be implemented by, for example, performing semantic segmentation on the image. An output of the position detection may be a position range including contour information of the target object. After cropping and size adjustment are performed on the position range, an image area covering the target object is obtained. For example, the first-stage neural network 110 may be configured to recognize a hand in the image and determine a position range (an area where the hand is located in the image) of the hand. Alternatively, the first-stage neural network 110 may be configured to recognize a face and determine a position range (an area where the face is located in the image) of the face.

In this embodiment of this disclosure, a hand or a face is used just as an example of the target object for description. The target object may be alternatively any other type of object. For example, the target object may be another part such as a foot, or the target object may be an entire human body, or the target object may be another specific type of object such as an animal, a plant or a house. The type of the target object is not limited in this disclosure.

The second-stage neural network 120 is configured to recognize a detail or a feature of the target object in the video image frame according to the position range of the target object (the area where the target object is located in the image), to obtain a recognition result. For example, gestures are classified to obtain gesture types. Alternatively, a face is recognized to obtain a facial expression.

Referring to FIG. 1, an image 210 that requires recognition is an image including a hand. The image 210 may be a frame in a video of a hand motion. The target object is the hand, and the purpose is to recognize a gesture of the hand. First, target position detection is performed through semantic segmentation by using the first-stage neural network 110, to obtain a contour (corresponding to 220 in FIG. 1) of the target object, that is, the contour of the hand in the image. The position range of the target object may be determined according to the contour of the hand. According to the position range, a sub-image corresponding to the position range of the target object in the image 210 may be obtained for further recognition of the target object in a next step. For example, cropping and size adjustment (corresponding to 230 in FIG. 1) may be performed on the image 210, to obtain a sub-image 240 that includes the hand and is suitable for gesture recognition, the hand occupying a majority area of the sub-image. The sub-image 240 is then inputted into the second-stage neural network 120 for gesture recognition, to obtain an output image 250 and an outputted feature vector (represented by a histogram 260) corresponding to a gesture type. For example, in this embodiment, the histogram 260 indicates that the gesture means "OK" or "compliment".

The analysis of the operation of the first-stage neural network and the second-stage neural network shows that for several commonly used CNN structures, a target object position detection task may involve distinguishing a target object from a background and performing edge detection on the target object, which may require a large number of convolutional layers and relatively large calculation workload. Compared with target detection, it is relatively easier to extract a feature in a classification task. Therefore, a network structure required by the second-stage neural network is less complex. Gesture recognition is used as an example. Experiments also prove that in an entire gesture recognition process, the consumed time and the CPU usage of the first-stage neural network are approximately five times as much as those of the second-stage neural network. That is, consumption mainly occurs on the first-stage neural network during target detection and recognition.

In an actual scenario, for example, a live broadcast using a mobile terminal, a user may keep changing gestures and facial expressions in front of a mobile phone. However, the position of a hand or the face changes slightly most of the time. That is, the hand or face basically either does not move or moves slowly. For a first-stage network, the range of the hand or the face in a current frame may be estimated by referring to a previous result calculated by the first-stage network, and the validity of the estimated range may be verified by using a result calculated by a second-stage network.

Figure 2:
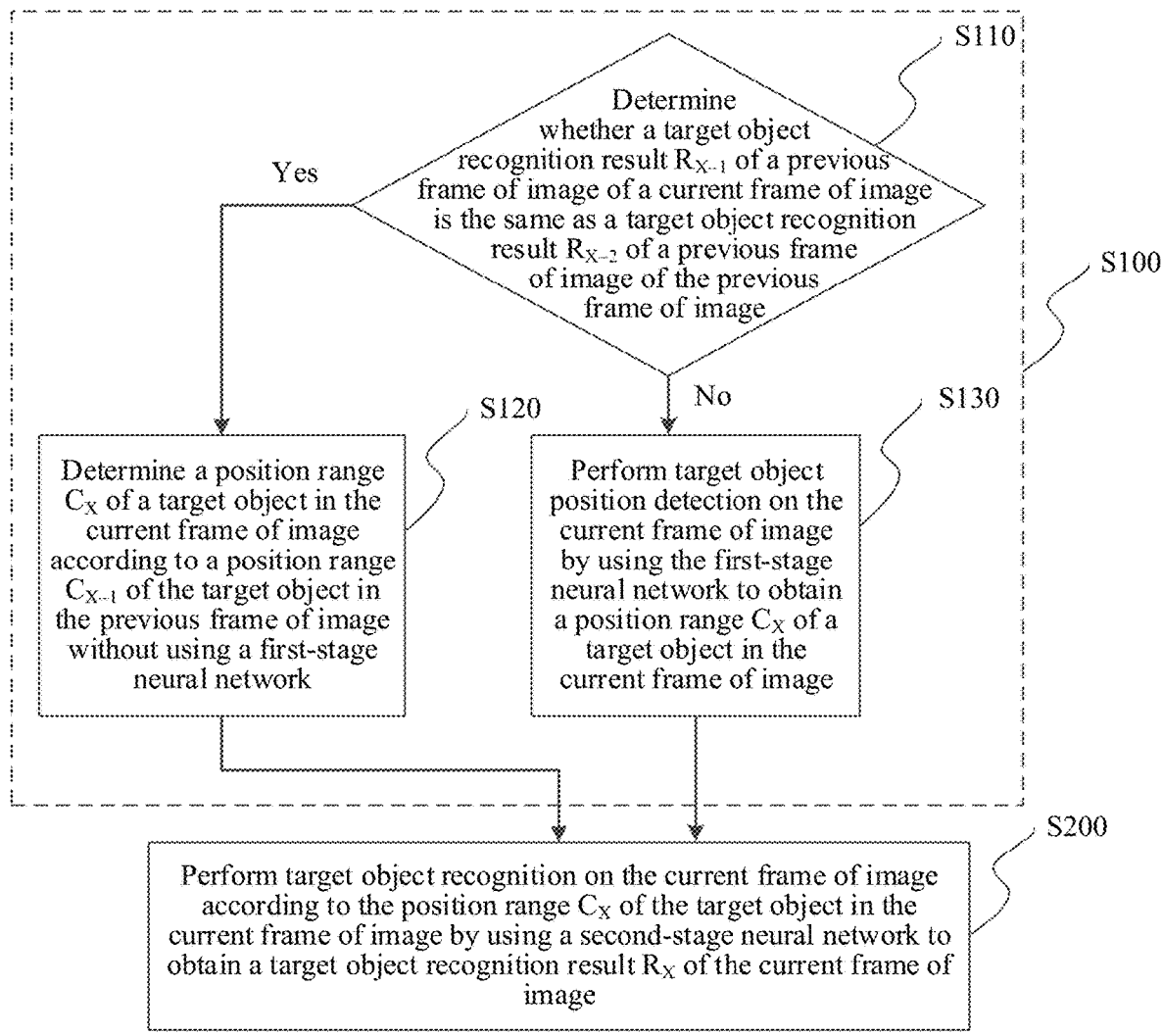
FIG. 2 is a schematic flowchart of a method for detecting and recognizing a target in a real-time video according to an embodiment of this disclosure.

FIG. 2 is a schematic flowchart of a method for detecting and recognizing a target in a real-time video according to an embodiment of this disclosure. Target object detection and recognition on each video frame may include steps S100 and S200. Step S100 further includes sub-steps S110 to S130.

CNNs may be used for both a first-stage neural network and a second-stage neural network. Training is performed in advance to obtain corresponding model parameters. The model parameters are then used for calculation for target detection and recognition.

Various network models such as an FCN model suitable for target object position detection may be used for the first-stage neural network. This is not limited in this disclosure. In some embodiments, a U-net model suitable for implementing semantic image segmentation may be used for the first-stage neural network.

A specific implementation of performing semantic segmentation on a video image frame by using an FCN or a U-net is similar to the implementation of semantic image segmentation in the related art. Details are not described herein again.

Various network models such as an AlexNet, a VGG, a GoogLeNet, and a ResNet suitable for target object recognition may be used for the second-stage neural network. This is not limited in this disclosure. A corresponding network model may be selected according to a recognition accuracy requirement and a hardware computation capability.

For example, for gesture recognition, the VGG model may be used for the second-stage neural network in consideration of the requirements of model complexity and recognition accuracy. In the related art, various methods for performing target object feature recognition by using a VGG model may be applied to the second-stage neural network in this disclosure. There are no special requirements for choosing a method. Details are not described herein again. With the rapid development of deep learning technologies, the accuracy of performing facial expression recognition based on non-display features by using deep neural networks is increasingly high, and the directly use of cascaded two-stage neural networks to perform facial expression recognition is faced with excellent application prospect. Network structures such as an AlexNet, a VGG, a GoogLeNet, and a ResNet may also be applied to facial expression recognition and gesture recognition.

Parameters of the first-stage neural network may be obtained through model training according to a target position detection purpose, and parameters of the second-stage neural network may be obtained through training according to a target recognition purpose, for example, according to adaptive classification, or through model training according to annotated data of a given classification category.

During the detection and recognition of a target in a real-time video, for each video image frame obtained through splitting, first, in step S100, a position range $C_X$ of a target object in a current frame of image is obtained.

The position range $C_X$ of the target object may be a range that has a regular shape and is determined according to the contour of the target object, for example, a rectangular range shown by the sub-image 240 in FIG. 1, to facilitate further recognition of the target object. The position range $C_X$ may be represented by a coordinate range, for example, the four vertices of a rectangle or the center and radius of a circle. A rectangular range is often used in image processing. According to the position range $C_X$ and the shape of the position range of the target object, a corresponding sub-image suitable for further recognition using the second-stage neural network may be obtained from the current frame of image.

The position of the target object tends to change slightly or remain unchanged in adjacent video frames. Therefore, it may be determined according to historical recognition results of frames previous to the current frame of image whether the first-stage neural network needs to be operated for position detection, thereby saving computing power. Step S100 may be specifically implemented by the following steps S110 to S130.

In step S110, it is determined whether a target object recognition result $R_{X-1}$ of a previous frame of image of the current frame of image is the same as a target object recognition result $R_{X-2}$ of a previous frame of image of the previous frame of image (may also be referred to as a second previous frame of image of the current frame of image).

This step is mainly intended to estimate the feasibility of applying a position detection result of the previous frame of image to the current frame of image. If the recognition result $R_{X-1}$ and $R_{X-2}$ are the same, it indicates that the target object is in a relatively stable state. That is, the target object may not move or the pose of the target object may remain unchanged. However, if $R_{X-1}$ and $R_{X-2}$ are different, the position of the target object tends to change.

Gesture recognition is used as an example. Gesture changes lead to different recognition results. In addition, if an input image to the second-stage neural network does not include a hand due to a change in the position of the target, that is, the hand in this example, a recognition result may be obtained due to the presence of a background object. That is, a case in which the position range $C_{X-1}$ does not include the "hand" may be indicated by a change in the gesture recognition result $R_{X-1}$.

Therefore, if the two recognition results $R_{X-1}$ and $R_{X-2}$ are different, step S130 needs to be performed: performing target object position detection on the current frame of image by using the first-stage neural network to obtain a position range $C_X$ of a target object in the current frame of image.

Figure 3:
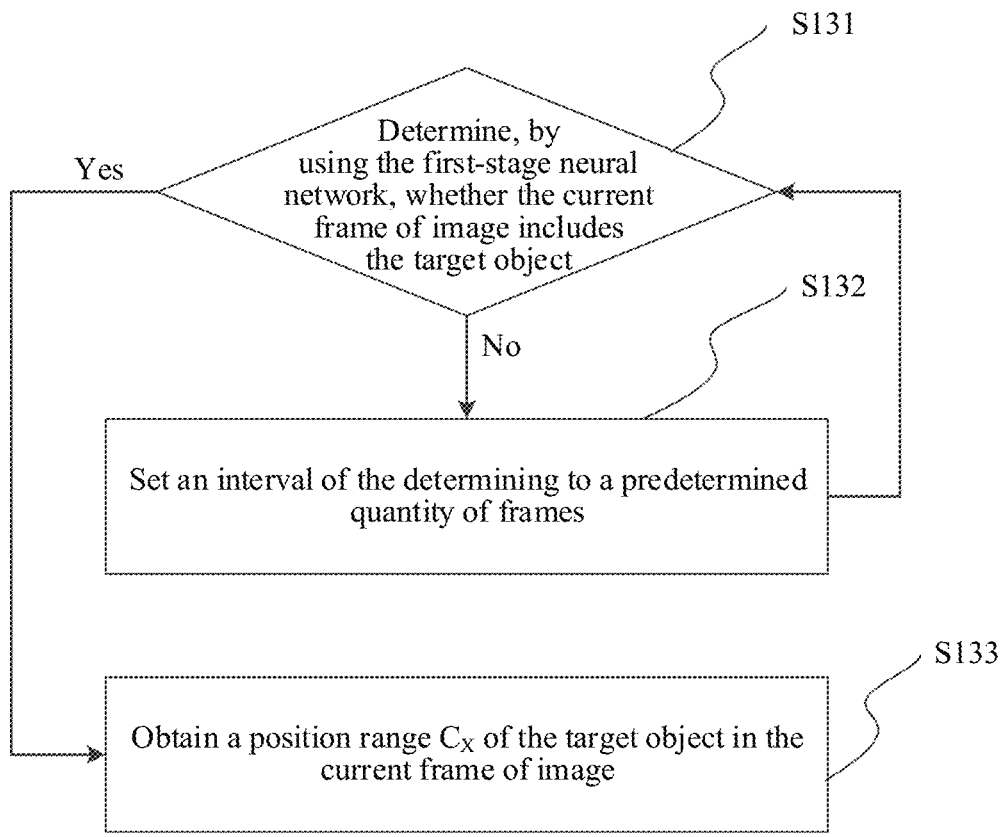
FIG. 3 is a schematic flowchart of performing target object position detection by using a first-stage neural network according to an embodiment of this disclosure.

FIG. 3 is a schematic flowchart of performing the target object position detection by using the first-stage neural network according to an embodiment of this disclosure. The performing target object position detection on the current frame of image by using the first-stage neural network may include step S131: determining, by using the first-stage neural network, whether the current frame of image includes the target object. If the current frame of image includes the target object, step S133 is performed: obtaining the position range $C_X$ of the target object in the current frame of image by using the first-stage neural network. If the current frame of image does not include the target object, further recognition is clearly not required and is skipped. In this case, step S132 is performed. The step of determining whether a coming new frame includes the hand may be performed for the next frame, or a frame with an interval of a predetermined number of frames. For example, if the predetermined number of frames is 4, then the 4th frame next to the current frame will be further evaluated for the presence of the target object.

In an application scenario such as gesture recognition or facial expression recognition, the moving speed of a human body is usually low. Assuming that a frame rate is 30 frames per second, if the current frame does not include the target object (for example, a hand or a face), several subsequent frames still may not include the target object. Therefore, an interval for determining whether a frame of image includes the target object may be set as a predetermined number of frames, and the determination may be continuously performed by using the first-stage neural network until it is determined that a frame of image includes the target object. For example, for gesture recognition, the frame interval may be set to 10 to 20 frames for the next evaluation. In one embodiment, the frame interval may be set based on the motion characteristics of the target object. For example, the frame interval is set to be inversely correlated with the motion speed of the target object. The faster the motion speed, the shorter the frame interval is set.

For a specific position detection process, any position detection algorithm in the related art may be used. This is not limited in this disclosure.

If the two recognition results $R_{X-1}$ and $R_{X-2}$ are the same, step S120 is performed: determining the position range $C_X$ of the target object in the current frame of image according to the position range $C_{X-1}$ of the target object in the previous frame of image without using the first-stage neural network.

Specifically, the position range $C_{X-1}$ of the target object in the previous frame of image may be directly used as the position range $C_X$ of the target object in the current frame of image. This manner is suitable for cases where the target object is stationary or moves slightly.

The target object may move in some cases. For example, during gesture recognition, a user may get tired after keeping the hand in the same position for a long time and relax by changing the position of the hand. In this case, the position of the hand may change slowly in image frames. Alternatively, during facial expression recognition, the head may turn or move, resulting in a change in the position of the face. Therefore, in some embodiments, the position range $C_X$ of the target object in the current frame of image may be predicted according to the position range of the target object in the previous frame of image and a position range of the target object in a frame of image previous to the current frame of image by a predefined number of frames denoted by n, where n is a positive integer. Based on the continuity of a hand motion and the time interval between the two frame of images used for prediction, a simple moving path fitting algorithm in a linear or low-order polynomial form may achieve better prediction, so as to obtain a more accurate position range $C_X$ of the target object.

In S140, target object recognition is performed on the current frame of image according to the position range $C_X$ of the target object in the current frame of image by using the second-stage neural network to obtain a target object recognition result Rx of the current frame of image.

The target object may move within a small range between two frames. To improve the accuracy of predicting the position range of the target object in the current frame by using the position detection result of the previous frame, the position range of the target object in each frame of image may be extended, and an image with a larger range may be used as an input of the second-stage neural network to increase the probability that the target object is covered in the larger range.

Specifically, before the target object recognition is performed on the current frame of image according to the position range $C_X$ of the target object in the current frame of image by using the second-stage neural network, the position range $C_X$ of the target object in the current frame of image is extended, to obtain an extended position range with an area increased by a predefined multiple, and the target object recognition is performed within the extended position range by using the second-stage neural network to obtain the target object recognition result $R_X$ of the current frame of image. The predefined multiple may be set according to the type of the target object. For example, a hand, normally moves faster than a head, may be set assigned a bigger multiple to obtain a bigger extended position range.

Figure 4:
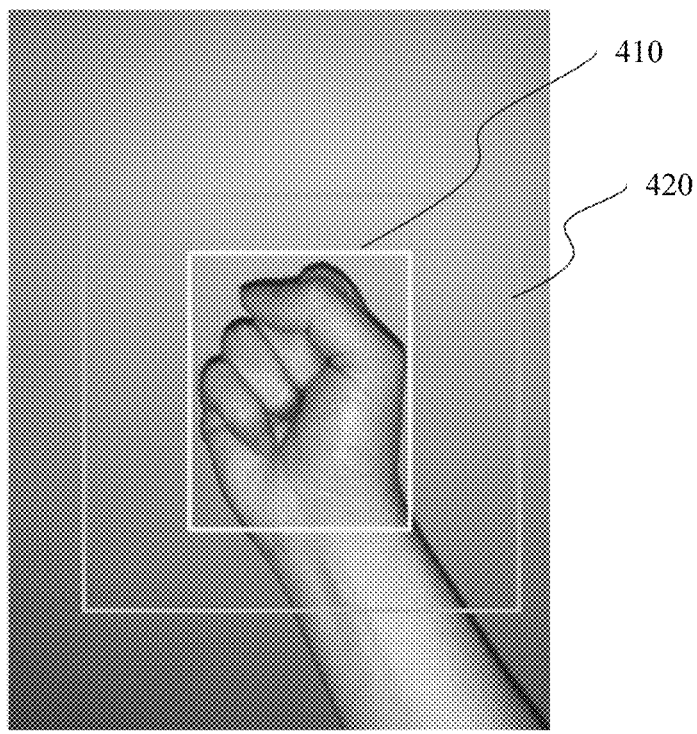
FIG. 4 is a schematic diagram of extending a target object position range according to this disclosure.

Referring to FIG. 4, an inner block 410 shows the position range $C_X$ of the target object in the current frame of image, and a range marked by an outer block 420 indicates a new position range used for the second-stage neural network after the extension.

In some embodiments, the method of this disclosure is used for gesture recognition. The target object is a hand. The performing target object position detection on the current frame of image by using the first-stage neural network to obtain the position range $C_X$ of the target object in the current frame of image includes: recognizing a position range of the hand in the current frame of image by using the first-stage neural network. The performing target object recognition on the current frame of image according to the position range $C_X$ of the target object in the current frame of image by using a second-stage neural network to obtain a target object recognition result $R_X$ of the current frame of image includes: performing gesture recognition on the hand in the current frame of image according to the position range $C_X$ of the target object in the current frame of image by using the second-stage neural network, a recognition result being a gesture pose.

Figure 5:
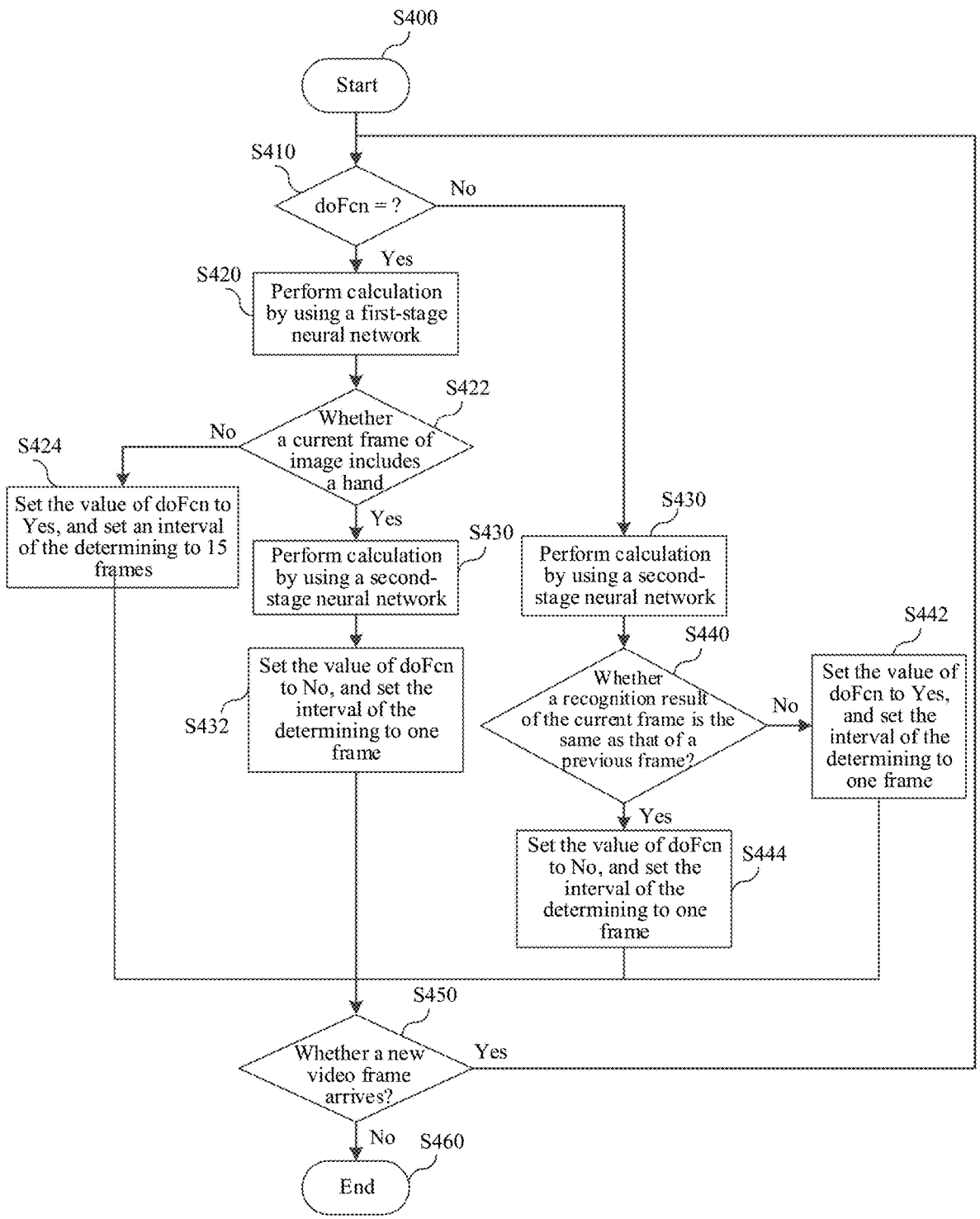
FIG. 5 is a schematic flowchart of implementing a gesture detection program according to an embodiment of this disclosure.

Referring to FIG. 5, the following describes in detail an embodiment of performing gesture recognition by using the method of this disclosure. FIG. 5 is a schematic flowchart of implementing a gesture detection program according to an embodiment of this disclosure. A variable doFcn is set as an identifier used for determining whether a first-stage neural network needs to be operated. The variable doFcn may be set to a Boolean variable, whose values, for example, may be "Yes" and "No". The two values correspond to performing and not performing target detection by using the first-stage neural network, respectively.

Step S400: Start a recognition process.

Step S410: Determine the value of the variable doFcn before performing detection on each frame; and if the value of doFcn is Yes, perform step S420; or if the value of doFcn is No, perform step S430.

In general, the value of doFcn may be determined according to a recognition result of a previous frame obtained by using the second-stage network and a recognition result of a previous frame of the previous frame obtained by using the second-stage network. It is assumed that the recognition result of the previous frame obtained by using the next-stage network is $R_{X-1}$, and the recognition result of the previous frame of image of the previous frame obtained by using the next-stage network is $R_{X-2}$. If $R_{X-1}$ is not equal to $R_{X-2}$, the value of doFcn is Yes. If $R_{X-1}$ is equal to $R_{X-2}$, the value of doFcn is No. The value of doFcn is set to Yes for the first frame to start with.

Step S420: If the value of doFcn is Yes, then target object position detection is needed. Perform a first-stage network operation for position detection on the current frame using the first-stage neural network.

First, step S422: Determine whether the current frame of image includes a hand; and if the current frame of image includes the hand, perform step S430; otherwise perform step S424.

Step S424: Set the value of doFcn to Yes because it is determined by using the first-stage neural network that the current frame does not include the hand, and set an interval for the next determining to 15 frames, that is, skip the second-stage detection for the current frame and skip both first-stage and second-stage operation for the 14 frames following the current frame, and send feedback to a user that video images do not include the hand. The detection is then resumed at the fifteenth frame. Certainly, in this embodiment, an interval of 15 frames is used as an example. The interval may be set to another number of frames based on practical consideration.

Step S430: Perform target recognition within a detected target position range through calculation using a second-stage neural network because it is determined by using the first-stage neural network that the current frame includes the hand. The current frame of image is then cropped according to a position range of the target object in the previous frame, to obtain a sub-image corresponding to the position range of the target object, and calculation is performed according to an area of the sub-image by using the second-stage neural network, to obtain a gesture type recognition result $R_X$.

Subsequently, because the "hand" has entered the range of a video frame and it is estimated the "hand" will stay in the next frame, so it is no longer necessary to wait for a large frame interval (15 frames in this example) to perform the next detection. Therefore, in subsequent step S432, the value of doFcn is set to No, and the interval for the determining is set to one frame. That is, it is set that step S422 needs to be performed for each frame.

If step S430 is performed after the value of doFcn is set to No in step S410 and target recognition is performed within the detected target position range through calculation using the second-stage neural network, step S440 may further be performed to determine whether the value of doFcn needs to be changed.

Step S440: Compare a recognition result of the current frame with the recognition result of the previous frame, to predict whether a target position range of the current frame can be used for a next frame and whether a corresponding value of doFcn needs to be set for the next frame; and if the recognition result of the current frame is the same as that of the previous frame, perform step S444; otherwise perform step S442.

Step S442: Set the value of doFcn to Yes, and set the determining interval to 1 frame.

Step S444: Set the value of doFcn to No, and set that step S422 is to be performed for each frame.

Step S450: Complete processing of the current frame, and determine whether a new video frame arrives; and if a new video frame arrives, go back to step S410 to determine the value of doFcn again; or if no new video frame arrives, perform step S460 to end the recognition process.

Through the foregoing steps, a gesture can be recognized quickly and accurately. A process of facial expression recognition is similar to the foregoing process. Only the hand and the gesture are replaced with a face and a facial expression, and the structures and parameters of a neural network model are adjusted accordingly. However, the overall concept is the same. Therefore, details are not described herein again.

According to the method for detecting and recognizing a target in a real-time video provided in this disclosure, a target object position detection result of a previous frame of image can be used to reduce the operating frequency of the first-stage neural network used for position detection, the speed of detecting and recognizing a target object is increased, and the usage of CPU and internal memory resources is reduced, thereby improving the overall performance of a recognition algorithm. In the condition that the two stages of a neural network adopt the same structure, compared with the solution in which a first-stage neural network is always operated on each frame of image, more than 50% of CPU resources can be saved by using the method of this disclosure.

Gesture recognition is used as an example. If a frame rate is 30 frames per second, for each frame of image, the time consumed to execute the first-stage neural network is T1, the time consumed to execute the second-stage neural network is T2, and T1=5T2. If a video frame does not include a hand, a ratio of the time consumed when the method of this disclosure is used to the time consumed when the method of this disclosure is not used is calculated as follows: 2*T1/30*(T1+T2)=2*10*T2/30*(5T2+T2)=11.11%. Accordingly, it may be considered that the calculation workload and CPU usage in a case in which the method of this disclosure is used are approximately 11.11% of the calculation workload and CPU usage in a case in which the method of this disclosure is not used.

If a video frame includes a hand, statistics show that if the gesture changes and the hand moves at a normal speed, the ratio for a correct prediction of the gesture position is approximately two frames out of 3 frames. A ratio of the time consumed when the method of this disclosure is used to the time consumed when the method of this disclosure is not used is calculated as follows: (10*T1+30*T2)/30*(T1+T2)=60*T2/30*(5T2+T2)=44.44%. Accordingly, it may be considered that the calculation workload and CPU usage in a case in which the method of this disclosure is used are approximately 44.44% of the calculation workload and CPU usage in a case in which the method of this disclosure is not used.

To implement the method provided in the embodiment of the first aspect, an embodiment of a second aspect of this disclosure provides a system for detecting and recognizing a target in a real-time video.

An implementation of the system for detecting and recognizing a target in a real-time video may include one or more computing devices. The computing device includes a processor and a memory. The memory stores an application that includes computer program instructions executable on the processor. The application may be divided into a plurality of program modules used for corresponding functions of various components of the system. The division of the program modules is logical but not physical. Each program module may be run on one or more computing devices, and one or more program modules may be run on one computing device. The following describes in detail the system of this disclosure according to functional and logical division of the program modules.

Figure 6:
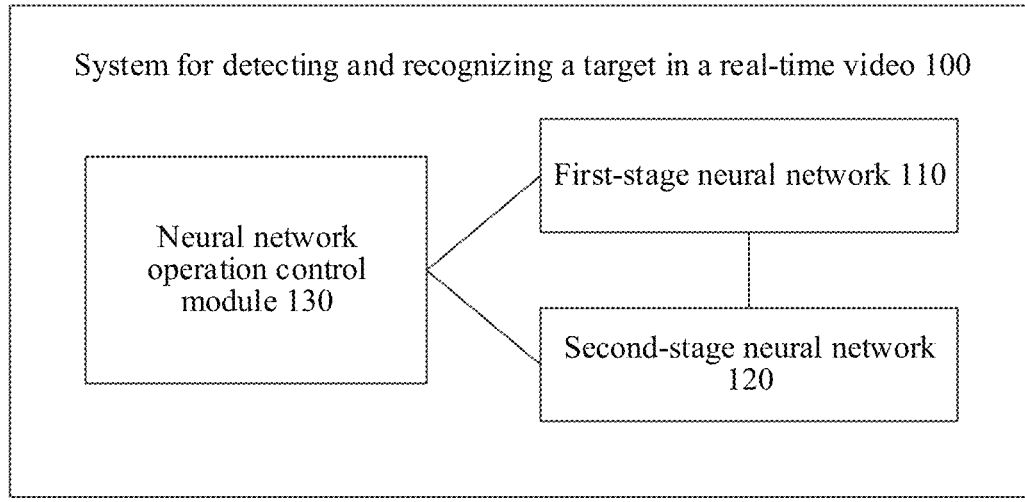
FIG. 6 is a structural block diagram of a system for detecting and recognizing a target in a real-time video according to an embodiment of this disclosure.

FIG. 6 is a structural block diagram of the system for detecting and recognizing a target in a real-time video according to an embodiment of this disclosure. The system 100 according to this disclosure may include a first-stage neural network 110, a second-stage neural network 120, and a neural network operation control module 130.

The system 100 for detecting and recognizing a target in a real-time video may be implemented by a computing device including a processor and a memory. The memory stores program modules that can be executed by the processor. Each program module, when executed, controls the computing device to implement a corresponding function. For example, the first-stage neural network 110, the second-stage neural network 120, and the neural network operation control module 130 may be implemented as such program modules.

The first-stage neural network 110 is configured to perform target object position detection on a video image frame to obtain a target object position range.

The second-stage neural network 120 is configured to perform target object recognition on the video image frame according to the target object position range to obtain a recognition result.

The neural network operation control module 130 is configured to control the first-stage neural network and the second-stage neural network to operate according to target object recognition results of previous video frame images. Specifically, the neural network operation control module 130 is configured to: determine whether a target object recognition result $R_{X-1}$ of a previous frame of image of a current frame of image is the same as a target object recognition result $R_{X-2}$ of a previous frame of image of the previous frame of image; control the first-stage neural network 110 to perform target object position detection on the current frame of image to obtain a position range $C_X$ of a target object in the current frame of image in a case that the two recognition results $R_{X-1}$ and $R_{X-2}$ are different; or determine a position range $C_X$ of a target object in the current frame of image according to a position range $C_{X-1}$ of the target object in the previous frame of image without using the first-stage neural network 110 in a case that the two recognition results $R_{X-1}$ and $R_{X-2}$ are the same; and control the second-stage neural network 120 to perform target object recognition on the current frame of image according to the position range $C_X$ of the target object in the current frame of image to obtain a target object recognition result $R_X$ of the current frame of image.

Figure 7:
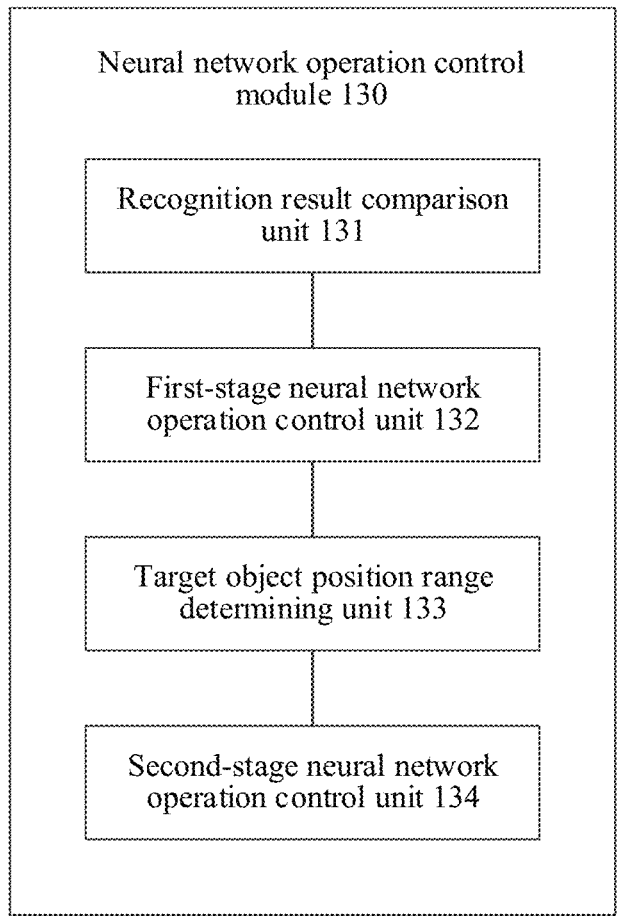
FIG. 7 is a structural block diagram of a neural network operation control module in a system for detecting and recognizing a target in a real-time video according to an embodiment of this disclosure.

FIG. 7 is a structural block diagram of the neural network operation control module in the system for detecting and recognizing a target in a real-time video according to an embodiment of this disclosure. The neural network operation control module 130 may further include a recognition result comparison unit 131, a first-stage neural network operation control unit 132, a target object position range determining unit 133, and a second-stage neural network operation control unit 134.

The recognition result comparison unit 131 is configured to determine whether the target object recognition result $R_{X-1}$ of the previous frame of image of the current frame of image is the same as the target object recognition result $R_{X-2}$ of the previous frame of image of the previous frame of image.

The first-stage neural network operation control unit 132 is configured to control the first-stage neural network 110 to perform the target object position detection on the current frame of image in a case that the two recognition results $R_{X-1}$ and $R_{X-2}$ are different.

In some embodiments, the controlling the first-stage neural network 110 to perform the target object position detection on the current frame of image may include: controlling the first-stage neural network 110 to determine whether the current frame of image includes the target object; controlling the first-stage neural network 110 to further obtain the position range $C_X$ of the target object in the current frame of image in a case that the current frame of image includes the target object; or setting an interval for determining whether a frame of image includes the target object to a predetermined number of frames in a case that the current frame of image does not include the target object, and controlling the first-stage neural network 110 to continuously perform determination until it is determined that a frame of image includes the target object.

The target object position range determining unit 133 is configured to obtain the position range $C_X$ of the target object in the current frame of image according to a target object position detection result of the current frame obtained by using the first-stage neural network 110 or a historically determined target object range.

In some embodiments, when determining the position range $C_X$ of the target object in the current frame of image according to the position range $C_{X-1}$ of the target object in the previous frame of image, the target object position range determining unit 133 is configured to use the position range $C_{X-1}$ of the target object in the previous frame of image as the position range $C_X$ of the target object in the current frame of image. Alternatively, in some other embodiments, the position range $C_X$ of the target object in the current frame of image may be predicted according to the position range of the target object in the previous frame of image and a position range of the target object in a frame of image previous to the current frame of image by a predefined number of frames.

The second-stage neural network operation control unit 134 is configured to control the second-stage neural network 120 to perform target object recognition on the current frame of image according to the position range $C_X$ of the target object in the current frame of image to obtain the target object recognition result $R_X$ of the current frame of image.

In some embodiments, the second-stage neural network operation control unit 134 is configured to: before performing the target object recognition on the current frame of image, extend the position range $C_X$ of the target object in the current frame of image to obtain an extended position range with an area increased by a predefined multiple; and control the second-stage neural network 120 to perform the target object recognition within the extended position range to obtain the target object recognition result $R_X$ of the current frame of image.

In particular, in some embodiments, the target object may be a hand; during controlling the first-stage neural network 110 to perform the target object position detection on the current frame of image to obtain the position range $C_X$ of the target object in the current frame of image, the first-stage neural network operation control unit 132 is configured to control the first-stage neural network 110 to recognize a position range of the hand in the current frame of image; during controlling the second-stage neural network 120 to perform the target object recognition on the current frame of image according to the position range $C_X$ of the target object in the current frame of image to obtain a target object recognition result $R_X$ of the current frame of image, the second-stage neural network operation control unit 134 is configured to control the second-stage neural network 120 to perform gesture recognition on the hand in the current frame of image according to the position range $C_X$ of the target object in the current frame of image, a recognition result being a gesture pose.

For details of a process of implementing the functions of the modules in the system for detecting and recognizing a target in a real-time video according to this disclosure, refer to an implementation process of corresponding steps in the foregoing method. The foregoing explanations and descriptions for the method embodiment of this disclosure are also applicable to the system embodiment of this disclosure because the system embodiment basically corresponds to the method embodiment. To avoid redundancy, all details are not repeated in the system embodiment. For details not shown, refer to the foregoing related descriptions in the embodiment of the method for detecting and recognizing a target in a real-time video with reference to FIG. 1 to FIG. 5.

According to the method for detecting and recognizing a target in a real-time video provided in this disclosure, a target object position detection result of a previous frame of image can be used, so that the operating frequency of a first-stage neural network used for position detection is reduced, the speed of detecting and recognizing a target object is increased, and the usage of CPU and internal memory resources is reduced, thereby improving the overall performance of a recognition algorithm. In the condition that the two stages of a neural network adopt the same structure, compared with the solution in which a first-stage neural network is running for recognition on each frame of image, more than 50% of CPU resources can be saved by using the method of this disclosure.

The method or the system in the foregoing embodiments of this disclosure may be applied to AI, so as to implement an AI application scenario based on object detection and recognition, for example, a scenario of interacting with an AI robot through gestures or facial expressions.

An embodiment of a third aspect of this disclosure provides a non-transitory computer-readable storage medium, the non-transitory computer-readable storage medium storing an executable instruction, the executable instruction, when running on a processor, implementing the method for detecting and recognizing a target in a real-time video according to the first aspect of this disclosure. The storage medium may be disposed on a device as a part of the device. Alternatively, when the device can be remotely controlled by a server, the storage medium may be disposed on the remote server that controls the device.

Any combination of one or more computer-readable media may be used to carry the computer instruction used for implementing the method of this disclosure. The non-transitory computer-readable medium may include any computer-readable medium, except for a signal that is temporarily propagated. The computer-readable storage medium may be, for example, but is not limited to, an electric, magnetic, optical, electromagnetic, infrared, or semi-conductive system, apparatus, or device, or any combination thereof. More specific examples of the computer-readable storage medium may include (but are not limited to), an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this disclosure, the computer-readable storage medium may be any tangible medium containing or storing a program, and the program may be used by or used in combination with an instruction execution system, an apparatus, or a device.

According to an embodiment of a fourth aspect of this disclosure, a computer program product is provided. When an instruction in the computer program product is executed by a processor, a method for detecting and recognizing a target in a real-time video in the embodiment of the first aspect of this disclosure is performed.

One or more programming languages or any combination thereof may be used to write the computer program code used for performing the operations in this disclosure. The programming languages include an object oriented programming language such as Java, Smalltalk, C++, or the like and a conventional procedural programming language, such as the "C" programming language or a similar programming language. The program code may be executed entirely on a computer of a user, partly on the computer of the user, as a stand-alone software package, partly on the computer of the user and partly on a remote computer, or entirely on the remote computer or a server. For the case involving a remote computer, the remote computer may be connected to a user computer through any type of network including a local area network (LAN) or a wide area network (WAN), or may be connected to an external computer (for example, through the Internet by using an Internet service provider).

An embodiment of a fifth aspect of this disclosure provides a computing device, the computing device including a memory, a processor, and a computer program stored in the memory and executable on the processor, the processor, when executing the program, implementing the method for detecting and recognizing a target in a real-time video according to the first aspect of this disclosure.

Specific implementations of related parts in the foregoing storage medium, the computer program product, and the computing device according to this disclosure may be obtained from the corresponding embodiment of the method or system for detecting and recognizing a target in a real-time video according to this disclosure, and have beneficial effects similar to those of the method or system for detecting and recognizing a target in a real-time video according to this disclosure. Therefore, details are not described herein again.

Figure 8:
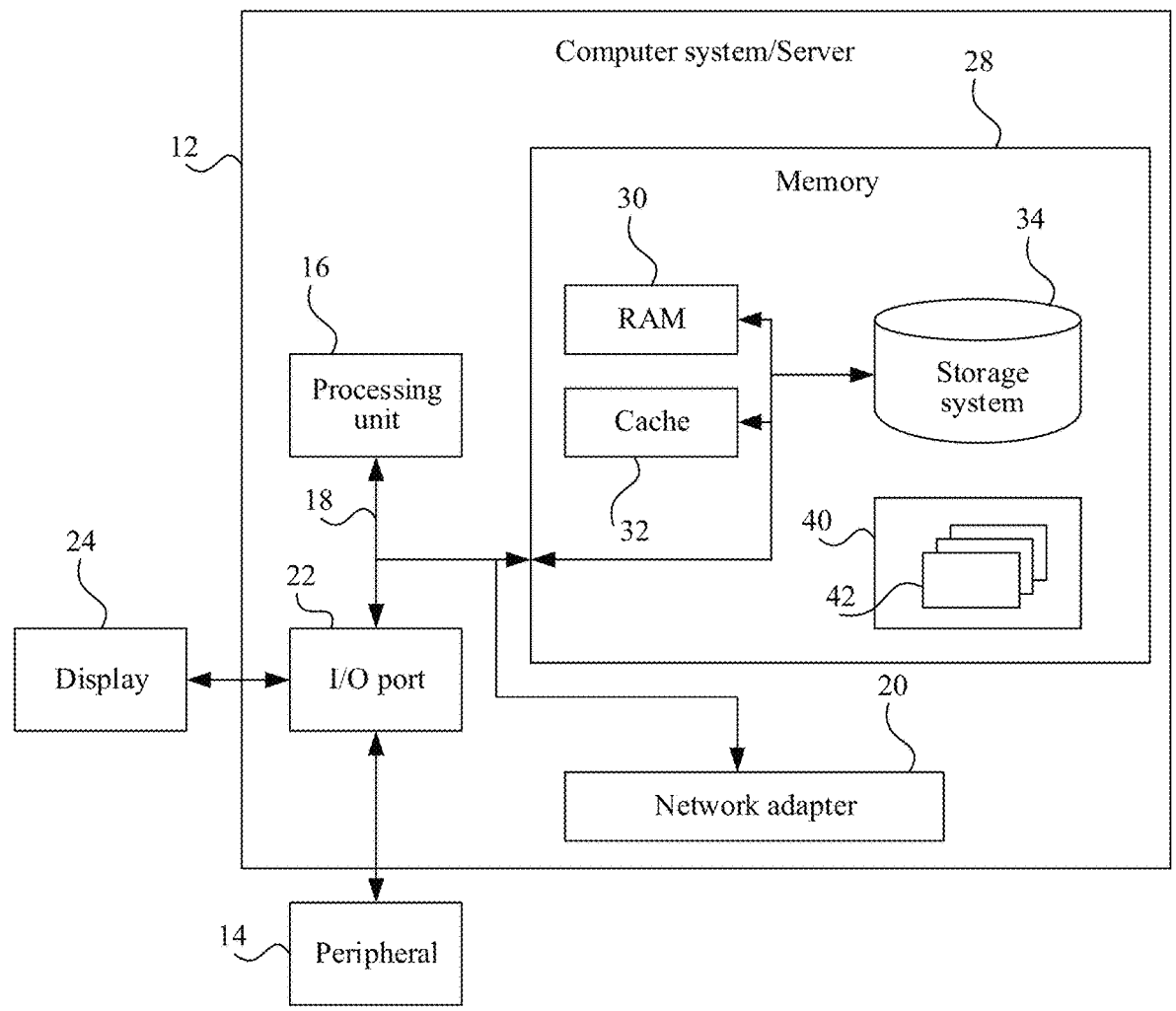
FIG. 8 is a schematic structural diagram of a computing device according to an embodiment of this disclosure.

FIG. 8 is a block diagram of an exemplary computing device suitable for implementing an implementation of this disclosure. The computing device 12 shown in FIG. 8 is merely an example and shall not impose any limitation on the functions and application scope of the embodiments of this disclosure.

As shown in FIG. 8, the computing device 12 may be implemented in the form of a general-purpose computing device. Components of the computing device 12 may include, but are not limited to, one or more processors or processing units 16, a system memory 28, and a bus 18 connecting different system components (including the system memory 28 and the one or more processing units 16).

The bus 18 represents one or more of several types of bus structures, including memory buses or memory controllers, peripheral buses, Accelerated Graphics Port buses, processors, or local buses using any of a plurality of bus structures. For example, these structures include, but are not limited to, Industry Standard Architecture (ISA) buses, Micro Channel Architecture (MAC) buses, enhanced ISA buses, Video Electronics Standards Association (VESA) local buses, and Peripheral Component Interconnection (PCI) buses.

The computing device 12 typically includes a plurality of computer system readable media. Such media may be any usable media that can be accessed by the computing device 12, including volatile and non-volatile, removable and non-removable media.

The memory 28 may include a computer system readable medium in the form of a volatile memory, such as a RAM 30 and/or a cache memory 32. The computing device 12 may further include another removable/non-removable, and volatile/non-volatile computer-readable storage medium. Merely taken as an example, a storage system 34 can be configured to read from or write to a non-removable, nonvolatile magnetic medium (not shown in the figure, generally called as a "hard drive interface"). Although not shown in FIG. 8, there may provide a magnetic disk drive that is configured to read from or write to a removable, nonvolatile magnetic disk (such as a floppy disk), and an optical disk drive that reads from or writes to a removable, nonvolatile optical disk such as a CD-ROM, a digital video disc read only memory (DVD-ROM), or another optical medium. In such cases, each drive can be connected to the bus 18 through one or more data medium interfaces. The memory 28 may include at least one program product having a set (for example, at least one) of program modules that are configured to perform the functions of the embodiments of this disclosure.

A program/utility 40, having a set (at least one) of program modules 42, may be stored in the memory 28 by way of example. Such program modules 42 includes, but is not limited to an operating system, one or more application programs, another program module, and program data. Each of such examples or some combination thereof may include an implementation of a networking environment. The program module 42 generally executes the function and/or the method of the embodiments described in this disclosure.

The computing device 12 may alternatively communicate with one or more external devices 14 (such as a keyboard, a pointing device, and a display 24), may alternatively communicate with one or more devices that enable a user to interact with the computer system/server 12, and/or communicate with any device (such as a network card and a modem.) that enables the computer system/server 12 to communicate with one or more other computing devices. Such communication can occur through an input/output (I/O) interfaces 22. The computing device 12 may further communicate with one or more networks such as a local area network (LAN), a wide area network (WAN), and/or a public network (such as Internet) through a network adapter 20. As shown in the figure, the network adapter 20 communicates with other modules of the computing device 12 through the bus 18. Although not shown in the figure, other hardware and/or software modules may be used with combination of the computing device 12, including, but not limited to a microcode, a device driver, a redundant processing unit, an external disk drive array, a RAID system, a tape drive, a data backup storage system, or the like.

The processing unit 16 executes the program stored in the system memory 28 to perform various functional applications and data processing, for example, implement the method according to the foregoing embodiments.

The non-transitory computer-readable storage medium, the computer program product, and the computing device according to the third aspect to the fifth aspects of this disclosure may be implemented with reference to the content specifically described according to the first aspect of this disclosure, and have a beneficial effect similar to the method for detecting and recognizing a target in a real-time video according to the first aspect of this disclosure. Details are not described herein again.

In the descriptions of this specification, descriptions using reference terms "an embodiment", "some embodiments", "an example", "a specific example", or "some examples" mean that specific characteristics, structures, materials, or features described with reference to the embodiment or example are included in at least one embodiment or example of this disclosure. In this specification, the schematic expression of the above terms is not necessarily for the same embodiment or example. Moreover, the specific features, structures, materials, or characteristics described may be combined in a suitable manner in any one or more embodiments or examples. In addition, without contradicting each other, those skilled in the art may combine different embodiments or examples and features of the different embodiments or examples described in this specification.

In addition, the terms "first" and "second" are merely for the purpose of description, and cannot be construed as indicating or implying relative importance or implicitly specifying the number of technical features indicated. Therefore, the features defined with "first" and "second" may include at least one of the features explicitly or implicitly. In the descriptions of this disclosure, "a plurality of" means two or more, such as two and three unless otherwise specifically defined.

A person of ordinary skill in the art may understand that all or part of the steps for implementing the method of the foregoing embodiments may be completed by instructing relevant hardware through a program. The program may be stored in a computer-readable storage medium. When executed, the program includes one of the steps of the method embodiment or a combination thereof.

In the description of this specification, any process or method in the flowcharts or described herein in another manner may be understood as indicating a module, a segment, or a part including code of one or more executable instructions for implementing a particular logical function or process step. In addition, the scope of exemplary embodiments of this disclosure include other implementations which do not follow the order shown or discussed, including performing, according to involved functions, the functions basically simultaneously or in a reverse order, which is to be understood by those skilled in the art to which the embodiments of this disclosure belong.

The logic and/or steps shown in the flowchart or described in other manners herein, for example, can be regarded as a sequence list of executable instructions for implementing logical functions, which can be specifically implemented in any computer-readable medium for use by or in combination with an instruction execution system, apparatus, or device (such as a computer-based system, a system including a processor, or other systems that can fetch and execute instructions from an instruction execution system, apparatus, or device). In terms of this specification, a "computer-readable medium" may be any apparatus that can contain, store, communicate, propagate, or transmit a program for use by or in combination with an instruction execution system, apparatus, or device.

It is to be understood that each part of this disclosure may be implemented by using hardware, software, firmware, or combinations thereof. In the foregoing implementations, a plurality of steps or methods may be implemented by using software or firmware that are stored in a memory and are executed by a proper instruction execution system. For example, if being implemented by hardware, like another implementation, the plurality of steps or methods may be implemented by any one of following common technologies in the art or a combination thereof: a discrete logic circuit of a logic gate circuit for realizing a logic function for a data signal, an application specific integrated circuit having a suitable combined logic gate circuit, a programmable gate array (PGA), a field programmable gate array (FPGA), and the like.

Although the embodiments of this disclosure are already shown and described above, it may be understood that the foregoing embodiments are exemplary, and are not to be understood as limitations to this disclosure. A person of ordinary skill in the art may change, modify, replace, and transform the foregoing embodiments within the scope of this disclosure.

What is claimed is:

1. A method for detecting and recognizing a target object in a video, performed by a computing device, comprising:
   determining historical target object recognition results of a target object in at least two previous frame of images;
   in response to the historical target object recognition results satisfying a first condition, performing target object position detection in a current frame of image by using a first-stage neural network to obtain a position range $C_X$ of the target object in the current frame of image; and
   in response to the historical target object recognition results satisfying a second condition, determining the position range $C_X$ of the target object in the current frame of image according to a position range $C_{X-1}$ of the target object in a previous frame of image of the current frame of image without using a first-stage neural network.

2. The method according to claim 1, wherein:
   determining the historical target object recognition results of the target object in the at least two previous frame of images comprises:
   determining a target object recognition result $R_{X-1}$ of the previous frame of image of the current frame of image, and a target object recognition result $R_{X-2}$ of a previous frame of image of the previous frame of image;

the first condition comprises $R_{X-1}$ and $R_{X-2}$ being different; and
the second condition comprises $R_{X-1}$ and $R_{X-2}$ being the same.

3. The method according to claim 2, wherein performing the target object position detection in the current frame of image by using the first-stage neural network comprises:
   determining, by using the first-stage neural network, whether the current frame of image comprises the target object;
   when the current frame of image comprises the target object, obtaining the position range $C_X$ of the target object in the current frame of image by using the first-stage neural network; and
   when the current frame of image does not comprise the target object, setting a detection interval for determining whether a frame of image comprises the target object to a predetermined number of frames, and performing one detection every interval by using the first-stage neural network until it is determined that a frame of image comprises the target object.

4. The method according to claim 2, wherein determining the position range $C_X$ of the target object in the current frame of image according to the position range $C_{X-1}$ of the target object in the previous frame of image comprises:
   using the position range $C_{X-1}$ of the target object in the previous frame of image as the position range $C_X$ of the target object in the current frame of image; or
   predicting the position range $C_X$ of the target object in the current frame of image according to the position range of the target object in the previous frame of image and a position range of the target object in a frame of image preceding the current frame of image by a predefined number of frames.

5. The method according to claim 2, further comprising:
   performing target object recognition in the current frame of image according to the position range $C_X$ of the target object in the current frame of image by using a second-stage neural network to obtain a target object recognition result $R_X$ of the current frame of image.

6. The method according to claim 5, wherein performing target object recognition in the current frame of image comprises:
   extending the position range $C_X$ of the target object in the current frame of image to obtain an extended position range with an area increased by a predefined multiple; and
   performing the target object recognition within the extended position range by using the second-stage neural network to obtain the target object recognition result $R_X$ of the current frame of image.

7. The method according to claim 5, wherein:
   the target object comprises a face;
   performing target object position detection in the current frame of image comprises: recognizing a position range of the face in the current frame of image by using the first-stage neural network; and
   performing target object recognition in the current frame of image comprises: performing expression recognition on the face in the current frame of image according to the position range $C_X$ of the target object in the current frame of image by using the second-stage neural network, a recognition result being an expression of the face.

8. A device for detecting and recognizing a target object in a video, the device comprising a memory for storing computer instructions and a processor in communication with the memory, wherein, when the processor executes the computer instructions, the processor is configured to cause the device to:
   determine historical target object recognition results of a target object in at least two previous frame of images;
   in response to the historical target object recognition results satisfying a first condition, perform target object position detection in a current frame of image by using a first-stage neural network to obtain a position range $C_X$ of the target object in the current frame of image; and
   in response to the historical target object recognition results satisfying a second condition, determine the position range $C_X$ of the target object in the current frame of image according to a position range $C_{X-1}$ of the target object in a previous frame of image of the current frame of image without using a first-stage neural network.

9. The device according to claim 8, wherein:
   when the processor is configured to cause the device to determine the historical target object recognition results of the target object in the at least two previous frame of images, the processor is configured to cause the device to:
      determine a target object recognition result $R_{X-1}$ of the previous frame of image of the current frame of image, and a target object recognition result $R_{X-2}$ of a previous frame of image of the previous frame of image;
   the first condition comprises $R_{X-1}$ and $R_{X-2}$ being different; and
   the second condition comprises $R_{X-1}$ and $R_{X-2}$ being the same.

10. The device according to claim 9, wherein, when the processor is configured to cause the device to perform the target object position detection in the current frame of image by using the first-stage neural network, the processor is configured to cause the device to:
    determine, by using the first-stage neural network, whether the current frame of image comprises the target object;
    when the current frame of image comprises the target object, obtain the position range $C_X$ of the target object in the current frame of image by using the first-stage neural network; and
    when the current frame of image does not comprise the target object, set a detection interval for determining whether a frame of image comprises the target object to a predetermined number of frames, and perform one detection every interval by using the first-stage neural network until it is determined that a frame of image comprises the target object.

11. The device according to claim 9, wherein, when the processor is configured to cause the device to determine the position range $C_X$ of the target object in the current frame of image according to the position range $C_{X-1}$ of the target object in the previous frame of image, the processor is configured to cause the device to:
    use the position range $C_{X-1}$ of the target object in the previous frame of image as the position range $C_X$ of the target object in the current frame of image; or
    predict the position range $C_X$ of the target object in the current frame of image according to the position range of the target object in the previous frame of image and a position range of the target object in a frame of image preceding the current frame of image by a predefined number of frames.

12. The device according to claim 9, wherein, when the processor executes the computer instructions, the processor is configured to further cause the device to:
  perform target object recognition in the current frame of image according to the position range $C_X$ of the target object in the current frame of image by using a second-stage neural network to obtain a target object recognition result $R_X$ of the current frame of image.

13. The device according to claim 12, wherein, when the processor is configured to cause the device to perform target object recognition in the current frame of image, the processor is configured to cause the device to:
  extend the position range $C_X$ of the target object in the current frame of image to obtain an extended position range with an area increased by a predefined multiple; and
  perform the target object recognition within the extended position range by using the second-stage neural network to obtain the target object recognition result $R_X$ of the current frame of image.

14. The device according to claim 12, wherein:
  the target object comprises a face;
  when the processor is configured to cause the device to perform target object position detection in the current frame of image, the processor is configured to cause the device to:
    recognize a position range of the face in the current frame of image by using the first-stage neural network; and
  when the processor is configured to cause the device to perform target object recognition in the current frame of image, the processor is configured to cause the device to:
    perform expression recognition on the face in the current frame of image according to the position range $C_X$ of the target object in the current frame of image by using the second-stage neural network, a recognition result being an expression of the face.

15. A non-transitory storage medium for storing computer readable instructions, the computer readable instructions, when executed by a processor, causing the processor to:
  determine historical target object recognition results of a target object in at least two previous frame of images;
  in response to the historical target object recognition results satisfying a first condition, perform target object position detection in a current frame of image by using a first-stage neural network to obtain a position range $C_X$ of the target object in the current frame of image; and
  in response to the historical target object recognition results satisfying a second condition, determine the position range $C_X$ of the target object in the current frame of image according to a position range $C_{X-1}$ of the target object in a previous frame of image of the current frame of image without using a first-stage neural network.

16. The non-transitory storage medium according to claim 15, wherein:
  when the computer readable instructions cause the processor determine the historical target object recognition results of the target object in the at least two previous frame of images, the computer readable instructions cause the processor to:
    determine a target object recognition result $R_{X-1}$ of the previous frame of image of the current frame of image, and a target object recognition result $R_{X-2}$ of a previous frame of image of the previous frame of image;
  the first condition comprises $R_{X-1}$ and $R_{X-2}$ being different; and
  the second condition comprises $R_{X-1}$ and $R_{X-2}$ being the same.

17. The non-transitory storage medium according to claim 16, wherein, when the computer readable instructions cause the processor to perform the target object position detection in the current frame of image by using the first-stage neural network, the computer readable instructions cause the processor to:
  determine, by using the first-stage neural network, whether the current frame of image comprises the target object;
  when the current frame of image comprises the target object, obtain the position range $C_X$ of the target object in the current frame of image by using the first-stage neural network; and
  when the current frame of image does not comprise the target object, set a detection interval for determining whether a frame of image comprises the target object to a predetermined number of frames, and perform one detection every interval by using the first-stage neural network until it is determined that a frame of image comprises the target object.

18. The non-transitory storage medium according to claim 16, wherein, when the computer readable instructions cause the processor to determine the position range $C_X$ of the target object in the current frame of image according to the position range $C_{X-1}$ of the target object in the previous frame of image, the computer readable instructions cause the processor to:
  use the position range $C_{X-1}$ of the target object in the previous frame of image as the position range $C_X$ of the target object in the current frame of image; or
  predict the position range $C_X$ of the target object in the current frame of image according to the position range of the target object in the previous frame of image and a position range of the target object in a frame of image preceding the current frame of image by a predefined number of frames.

19. The non-transitory storage medium according to claim 16, wherein, the computer readable instructions further cause the processor to:
  perform target object recognition in the current frame of image according to the position range $C_X$ of the target object in the current frame of image by using a second-stage neural network to obtain a target object recognition result $R_X$ of the current frame of image.

20. The non-transitory storage medium according to claim 19, wherein, when the computer readable instructions cause the processor to perform target object recognition in the current frame of image, the computer readable instructions cause the processor to:
  extend the position range $C_X$ of the target object in the current frame of image to obtain an extended position range with an area increased by a predefined multiple; and
  perform the target object recognition within the extended position range by using the second-stage neural network to obtain the target object recognition result $R_X$ of the current frame of image.

* * * * *